US 11,366,423 B2

(12) United States Patent
Luke et al.

(10) Patent No.: US 11,366,423 B2
(45) Date of Patent: Jun. 21, 2022

(54) DRIVE ADAPTER

(71) Applicant: Hewlett-Packard Development Company, L.P., Spring, TX (US)

(72) Inventors: Jeffrey Harold Luke, Boise, ID (US); Justin D Pettingill, Boise, ID (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 0 days.

(21) Appl. No.: 17/312,146

(22) PCT Filed: Oct. 11, 2019

(86) PCT No.: PCT/US2019/055833
§ 371 (c)(1),
(2) Date: Jun. 9, 2021

(87) PCT Pub. No.: WO2021/071506
PCT Pub. Date: Apr. 15, 2021

(65) Prior Publication Data
US 2022/0057746 A1 Feb. 24, 2022

(51) Int. Cl.
*G03G 21/18* (2006.01)
*F16D 1/112* (2006.01)
*G03G 15/08* (2006.01)

(52) U.S. Cl.
CPC ......... *G03G 21/1857* (2013.01); *F16D 1/112* (2013.01); *G03G 15/08* (2013.01)

(58) Field of Classification Search
CPC ..... G03G 21/1857; G03G 15/08; F16D 1/112
See application file for complete search history.

(56) References Cited

U.S. PATENT DOCUMENTS

| 3,406,534 | A | 10/1968 | Chapper |
| 5,655,692 | A * | 8/1997 | Navin ................. B65G 65/463 222/413 |
| 6,074,304 | A | 6/2000 | Olbrich et al. |
| 6,266,506 | B1 | 7/2001 | Kurz et al. |
| 6,892,042 | B2 | 5/2005 | Jang et al. |
| 8,417,154 | B2 * | 4/2013 | Nieda ................. G03G 15/757 399/167 |
| 8,628,269 | B2 | 1/2014 | Fan |
| 8,644,733 | B2 | 2/2014 | Peng et al. |
| 8,731,438 | B2 * | 5/2014 | Okabe ................. G03G 21/186 399/167 |

(Continued)

FOREIGN PATENT DOCUMENTS

| JP | 6-130737 A | 5/1994 |
| JP | 10-252767 A | 9/1998 |

*Primary Examiner* — Francis C Gray
(74) *Attorney, Agent, or Firm* — Jefferson IP Law, LLP

(57) ABSTRACT

In one example, a detachable adapter to adapt a drive shaft on a printer to a drive mechanism on a toner cartridge and to transmit rotation of the drive shaft to the drive mechanism. The adapter includes a cylindrical part having a first end and a second end opposite the first end, the first end configured to detachably receive and engage an end of the drive shaft so that the part will rotate with the drive shaft when the part is attached to the drive shaft, and a driver mounted to or integral with the second end and configured to drivingly connect the part to the drive mechanism on the toner cartridge when the part is attached to the drive shaft and the toner cartridge is installed in the printer.

11 Claims, 12 Drawing Sheets

(56) References Cited

U.S. PATENT DOCUMENTS

| | | |
|---|---|---|
| 9,098,055 B2 | 8/2015 | Maul |
| 9,588,478 B1 | 3/2017 | Fan |
| 9,746,826 B2 | 8/2017 | Ueno et al. |
| 9,836,015 B2 | 12/2017 | Morioka et al. |
| 9,841,729 B2 | 12/2017 | Ueno et al. |
| 9,857,765 B2 | 1/2018 | Ueno et al. |
| 9,869,960 B2 | 1/2018 | Ueno et al. |
| 9,880,518 B2 * | 1/2018 | Wen .................. G03G 21/1842 |
| 9,897,963 B2 | 2/2018 | Huck et al. |
| 10,108,142 B2 | 10/2018 | Leemhuis et al. |
| 2007/0122188 A1 * | 5/2007 | Igarashi ............. G03G 15/0806 399/119 |
| 2015/0050048 A1 * | 2/2015 | Huang ................ G03G 15/757 399/167 |

\* cited by examiner

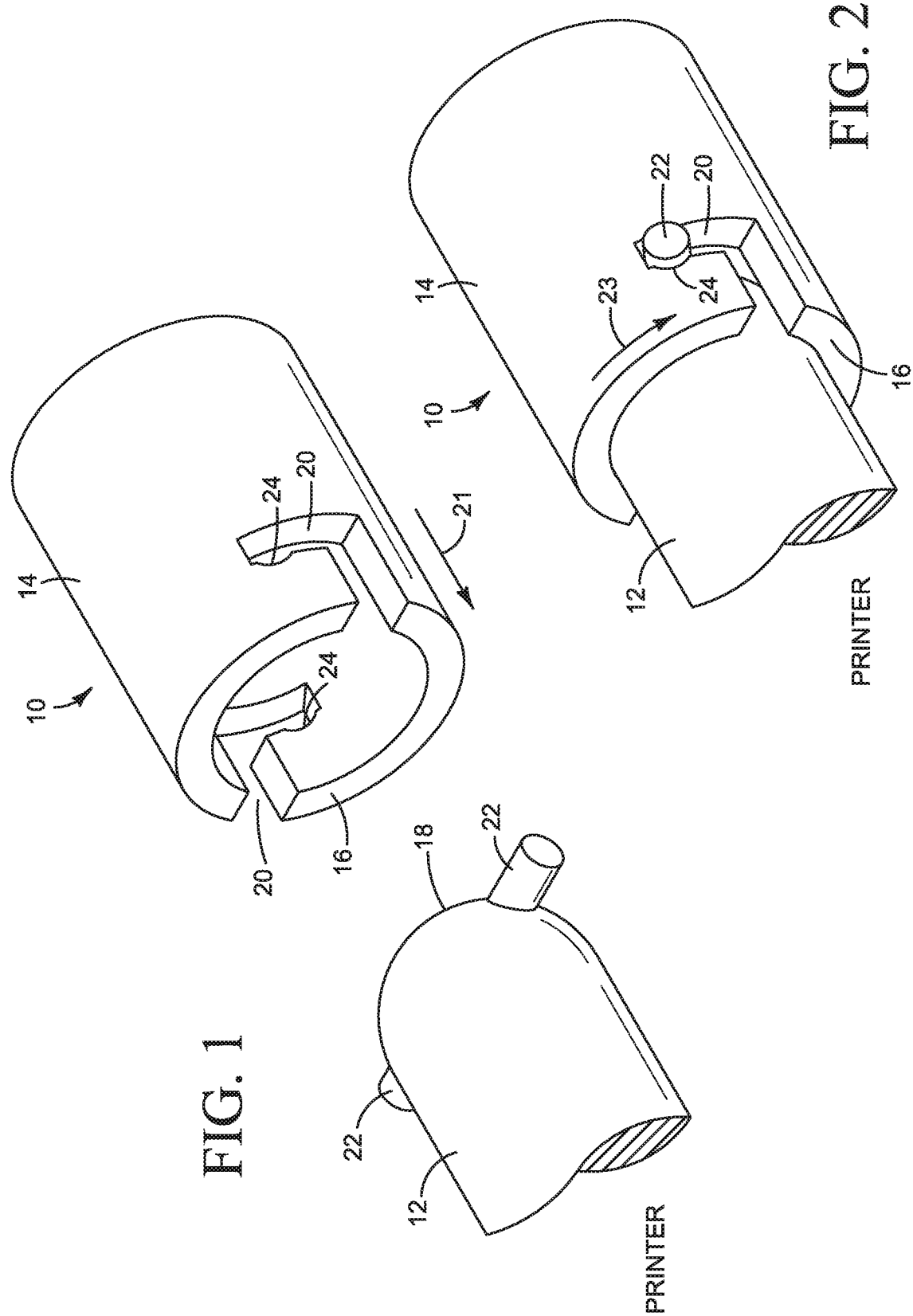

DRIVE ADAPTER

BACKGROUND

Many replaceable toner cartridges for laser printers include a cylindrical photoconductor and a developer roller that are rotated during printing at the urging of a motor and drive shaft in the printer. When a toner cartridge is installed in the printer, a connection is made between the drive shaft in the printer and a drive mechanism on the cartridge to rotate the photoconductor and the developer roller.

DRAWINGS

FIGS. 1-4 illustrate one example of an adapter for a printer drive shaft.

The figures are not necessarily to scale.

DESCRIPTION

One type of drive shaft used in laser printers to rotate components in the toner cartridge utilizes pins that extend radially out near the end of the drive shaft to engage a mating part on the cartridge. The universe of toner cartridges that may now be used in such "pin drive" laser printers is limited to cartridges constructed with a mating part. A detachable and thus portable adapter has been developed that enables the use of other types of toner cartridges in "pin drive" laser printers to expand the universe of cartridges compatible with such printers. One end of the adapter is mated to the pin drive shaft on the printer so the adapter may be attached to and detached from the printer drive shaft. The other end of the adapter is configured to make an operative/driving connection to a toner cartridge as the cartridge is installed in the printer. Different end configurations on the adapter enable the use of different types of toner cartridges with a pin drive printer.

The examples described herein illustrate but do not limit the scope of the patent, which is defined in the Claims following this Description.

As used in this document, "configured to" perform a function means designed and/or constructed to perform the function and not merely capable of performing the function; and "stationary" means stationary with respect to other parts of the same component and does not exclude the component itself moving with respect to another component.

Figure 3:
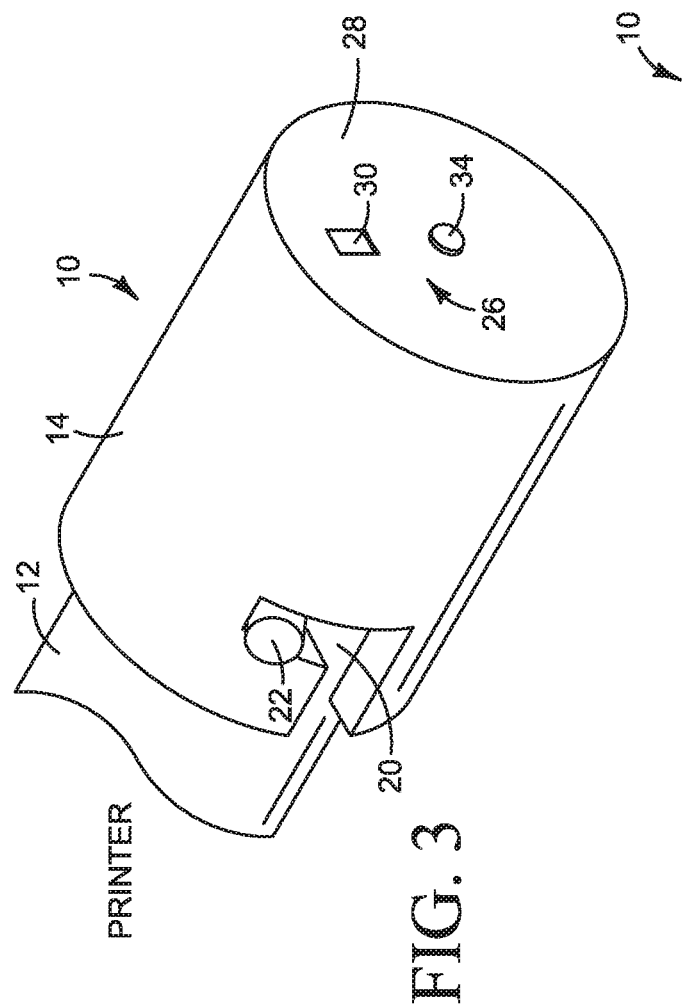
Figure 4:
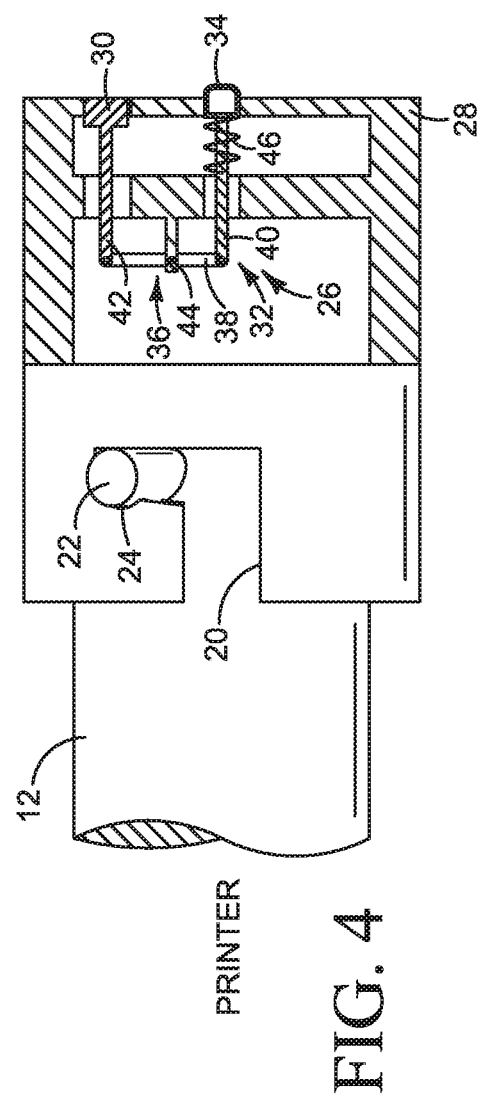

FIGS. 1-4 illustrate one example of an adapter 10 for a printer pin drive shaft 12. FIG. 1 shows adapter 10 exploded away from drive shaft 12. FIGS. 2 and 3 show adapter 10 attached to drive shaft 12. FIG. 4 is a partial section view showing internal parts of adapter 10. Referring to FIGS. 1-4, adapter 10 includes a cylindrical body 14 with a hollow first end 16 to receive the end 18 of drive shaft 12. A pair of pins 22 extend radially out from drive shaft 12 at or near shaft end 18. A pair of L shaped slots 20 in adapter end 16 receive and engage pins 22 so that adapter 10 rotates with drive shaft 12. As shown in FIGS. 1 and 2, with slots 20 aligned to pins 22, adapter 10 is slid onto the end of drive shaft 12, as indicated by arrow 21, and rotated to engage pins 22 at the ends of slots 20, as indicated by arrow 23. A notch 24 in the end of each slot 20 may be used to help retain pins 22 at the end of the slots.

Referring to FIGS. 3 and 4, a driver 26 is mounted to the second end 28 of adapter body 14. Driver 26 is configured to transmit rotation of adapter 10 to a drive mechanism on a toner cartridge. In this example, as best seen in FIG. 4, driver 26 includes a radially stationary drive pin 30 and an actuator 32 to extend and retract pin 30 axially, as described below with reference to FIGS. 7-9. Actuator 32 includes a button 34 operatively connected to drive pin 30 through a linkage 36. In this example, linkage 36 includes a rocker arm 38 connected between a first push rod 40 connected to button 34 and a second push rod 42 connected to pin 30. Rocker arm 38 pivots on a fulcrum 44. A spring 46 connected between push rod 40 and button 34 urges button 34 towards the exposed position shown in FIG. 4.

Figure 6:
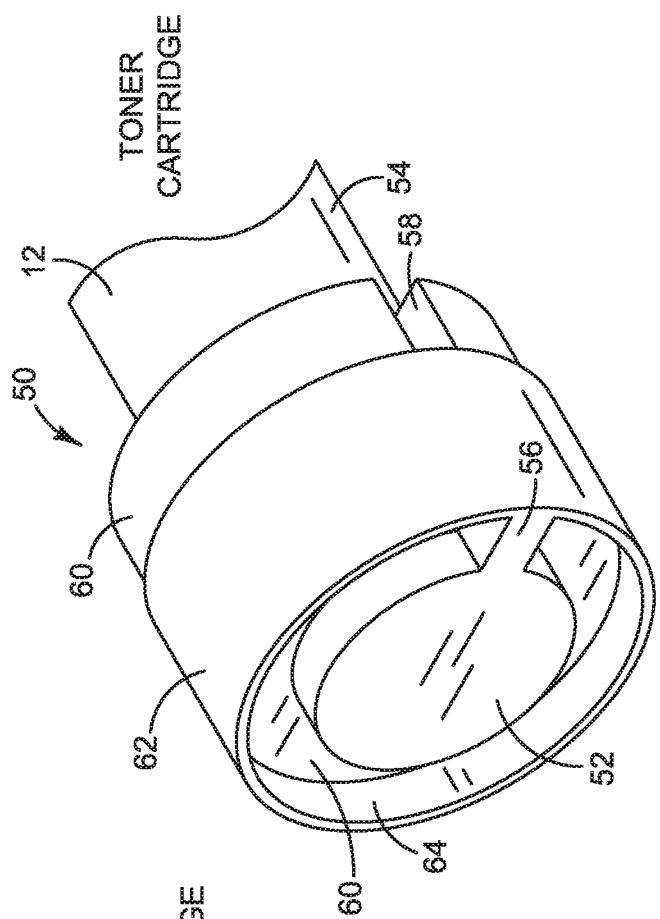
FIGS. 5 and 6 illustrate one example of a connector for a toner cartridge drive mechanism.
Figure 5:
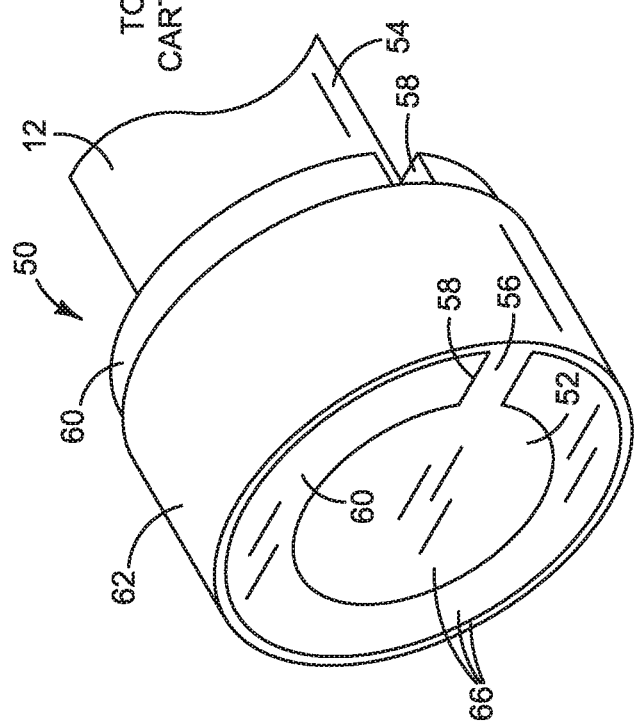

FIGS. 5 and 6 illustrate one example of a connector 50 for a toner cartridge drive mechanism. Connector 50 provides the operative connection between adapter 10 and the toner cartridge. Connector 50 is configured to transmit the rotation of printer drive shaft 12 through adapter 10 to the rotary components in a toner cartridge, as described below with reference to FIGS. 7-10. Connector 50 may be an integral part of the toner cartridge drive mechanism or coupled to the cartridge drive mechanism.

Referring to FIGS. 5 and 6, in this example connector 50 includes coaxial first and second shafts 52, 54 operatively coupled through a key 56 and a keyway 58. FIG. 5 shows shaft 54 in an extended position for inserting a toner cartridge into the printer. FIG. 6 shows shaft 54 in a retracted position to engage adapter 10 (FIGS. 1-4). Key 56 extends radially out from shaft 52. Keyway 58 is formed axially in a ring 60 that extends out from the end of shaft 54. Shaft 52 fits inside ring 60. The outside diameter of shaft 52 matches the inside diameter of ring 60 to help keep shaft 52 aligned with shaft 54. In this example, connector 50 also includes an annular housing 62 surrounding shaft 52 to help support key 56. Also, the inside diameter of housing 62 matches the outside diameter of ring 60 to help keep shaft 52 aligned with shaft 54. Retracting shaft 54 as shown in FIG. 6 creates a recess 64 to receive adapter drive pin 30 (FIGS. 1-4), as described below with reference to FIGS. 7-9.

Figure 7:
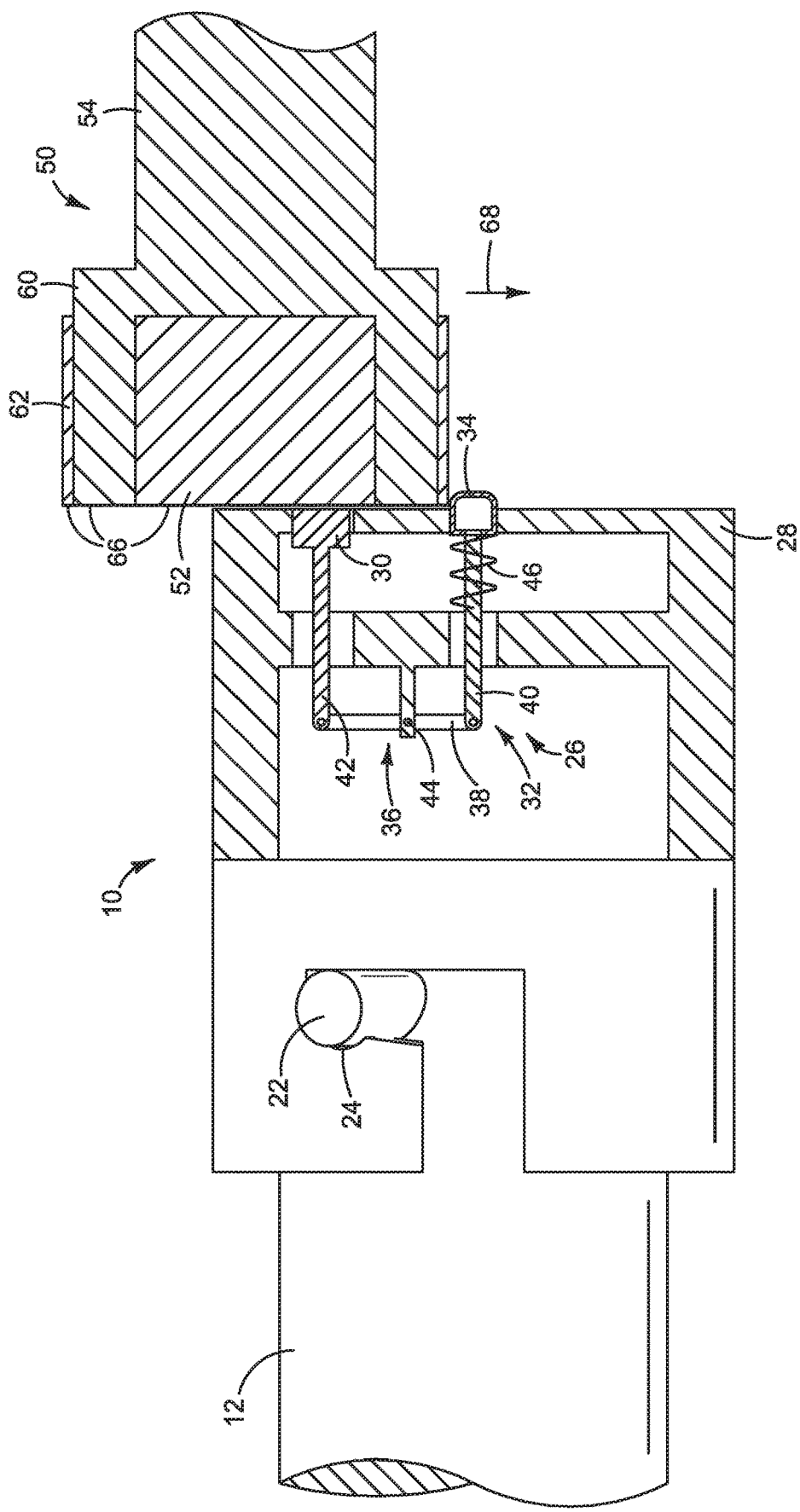
FIGS. 7-9 illustrate installing a toner cartridge with a connector shown in FIGS. 5 and 6 into a printer with a drive shaft and adapter shown in FIGS. 1-4.
Figure 8:
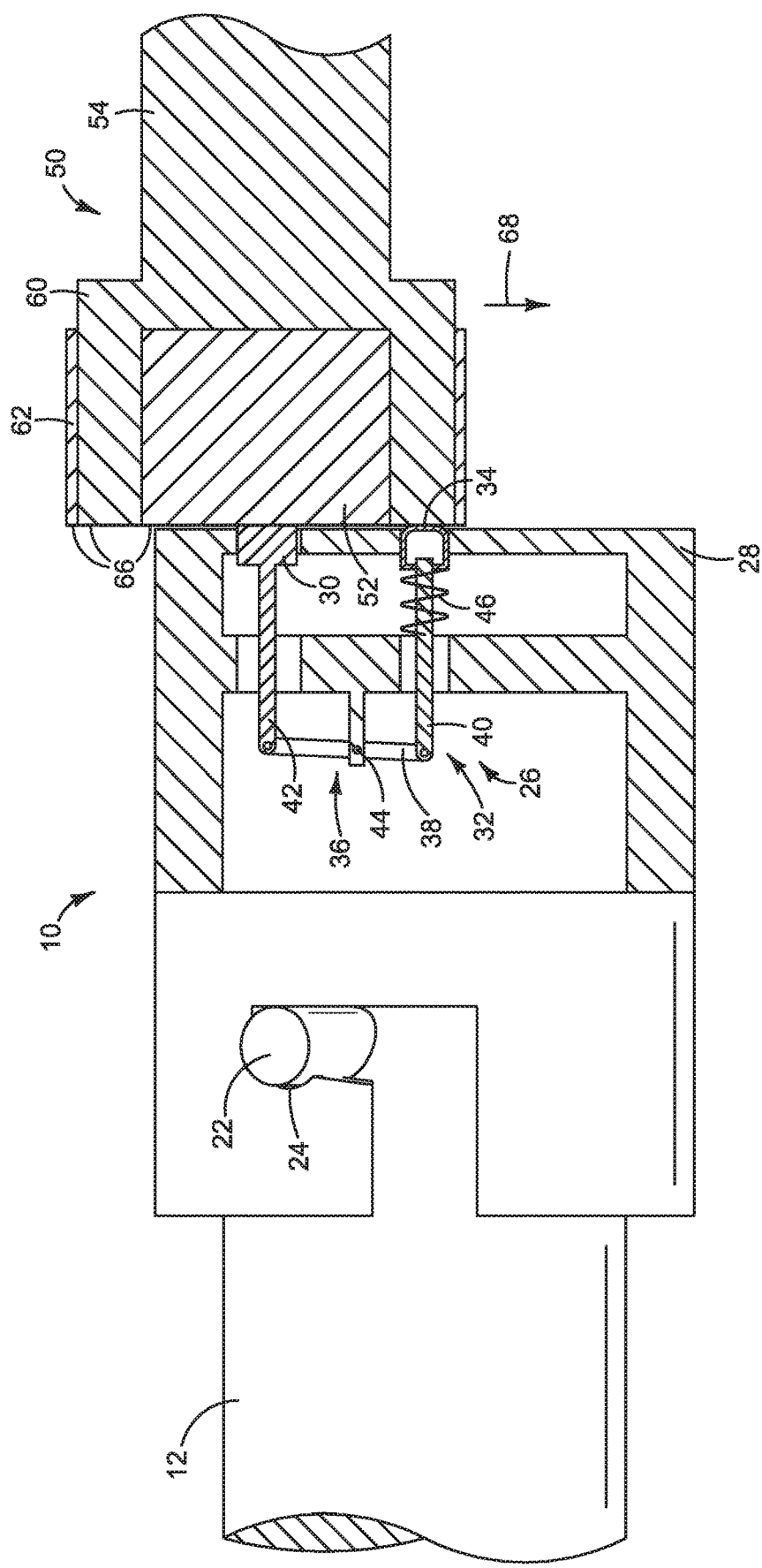
Figure 9:
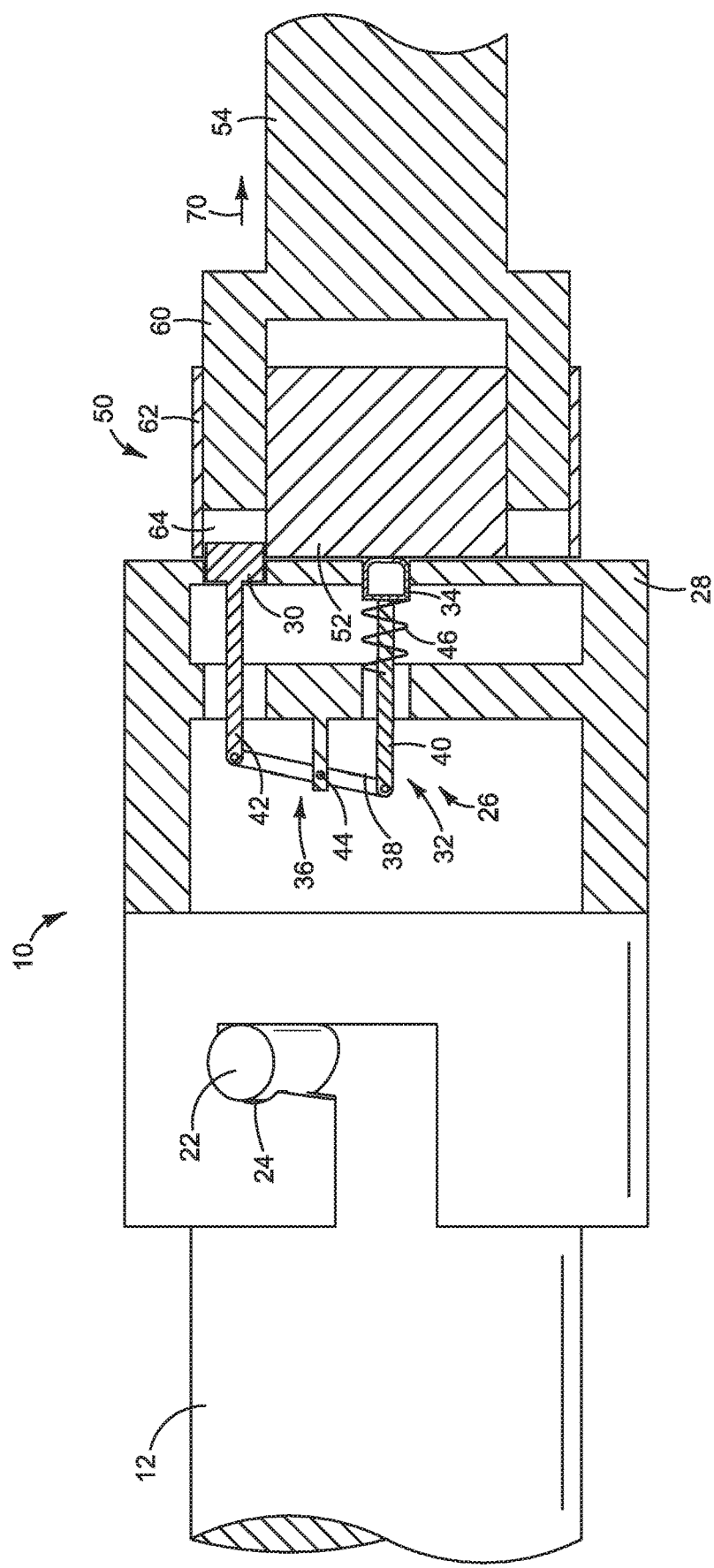

FIGS. 7-9 show installing a toner cartridge with connector 50 into a printer with drive shaft 12. Adapter 10 is already installed on the end of drive shaft 12 in FIGS. 7-9. Referring to FIG. 7, connector shaft 54 with ring 60 is extended to present a continuous flat face 66 to the end 28 of adapter 10. With connector shaft 54 extended, connector 60 is slid along the end 28 of adapter 10 with connector shafts 52, 54 parallel to drive shaft 12, as indicated by arrow 68. Connector shaft 54 may be extended, for example, by the user depressing an "extension" lever on the toner cartridge. Connector 50 engages and depresses actuator button 34 on adapter 10. In FIG. 8, button 34 is depressed while drive pin 30 is blocked by connector shaft 52.

Actuator 32 is configured to accommodate the depression of button 34 with drive pin 30 blocked by connector shaft 52. In this example, a hollow actuator button 34 slides back along push rod 40 when button 34 is depressed and drive pin 30 is blocked by connector 50, as best seen by comparing the position of button 34 in FIGS. 7 and 8. Button 34 further compresses biasing spring 46 as it moves back along push rod 40.

Referring to FIG. 9, when the toner cartridge is fully inserted, connector shaft 54 is retracted, as indicated by arrow 70, key 56 is exposed in recess 64 and drive pin 30 moves into recess 64 at the urging of spring 46. Thus, in this example, driver 26 on adapter 10 includes a movable male part, drive pin 30, and connector 50 includes a stationary female part, recess 64, to receive the movable male part on adapter 10. Connector shaft 54 may be retracted, for example, by the user releasing a spring loaded extension lever and the spring returning shaft 54 to the retracted position. The sequence is reversed when the toner cartridge is removed from the printer. If drive pin 30 and key 56 happen to be aligned radially when connector shaft 54 is retracted in FIG. 9, thus preventing drive pin 30 extending into recess 64, drive pin 30 will move off key 56 and pop into recess 64 as soon as adapter 10 begins to rotate.

Figure 10:
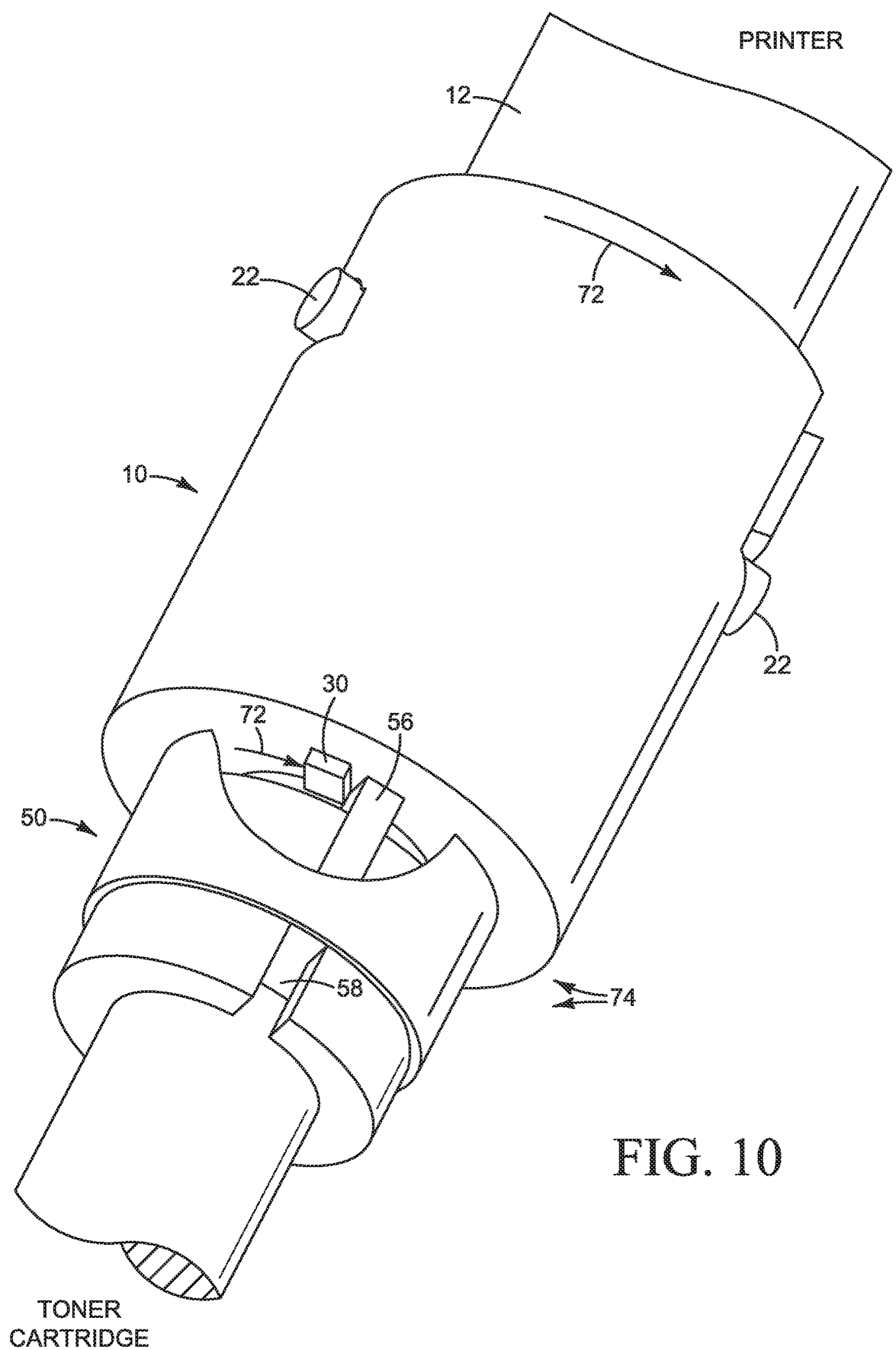
FIG. 10 illustrates one example of an assembly that connects a driving shaft to a driven shaft.
Figure 11:
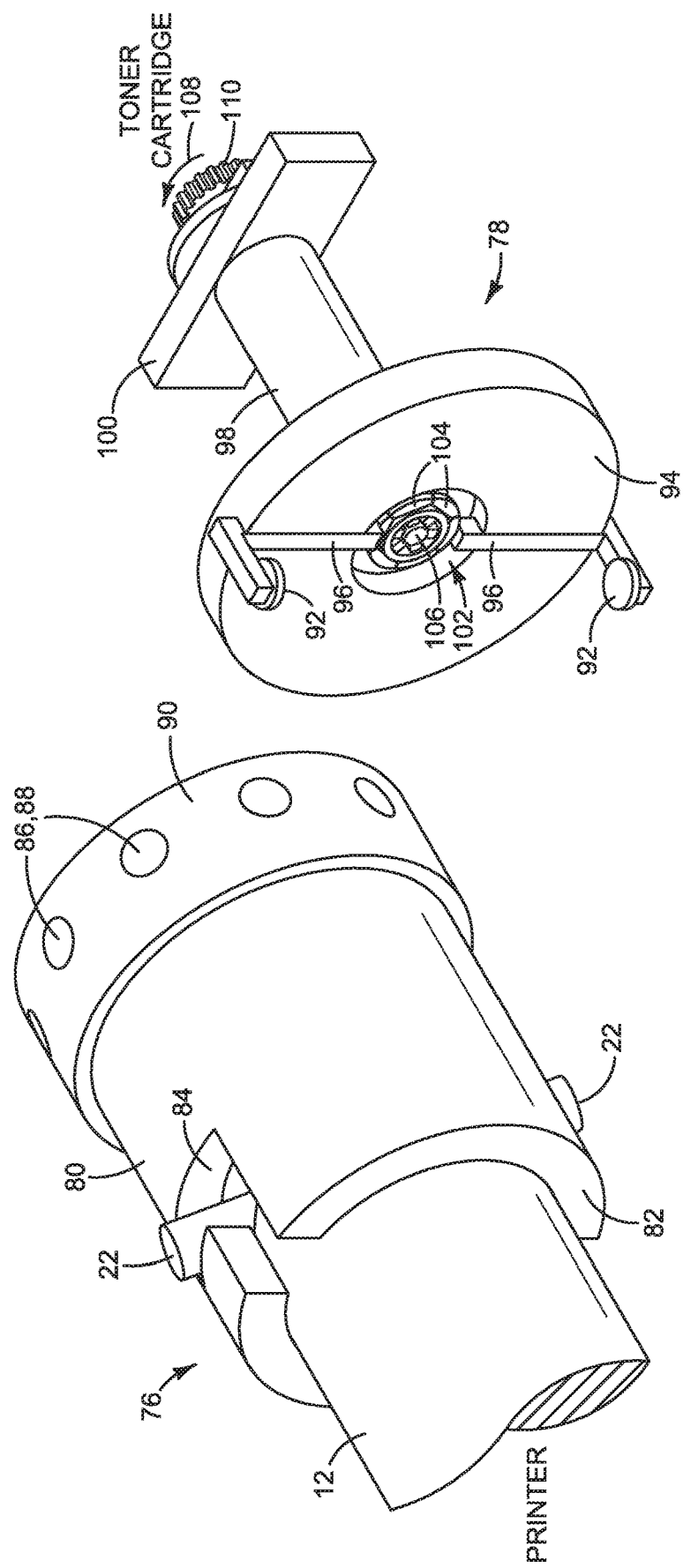
FIGS. 11-15 illustrate one example of an adapter for a printer pin drive shaft and a connector for a toner cartridge drive mechanism.

Referring to FIG. 10, the exposed key 56 on connector 50 blocks and thus engages an extended, rotating drive pin 30 on adapter 10 to transmit the rotation of adapter 10 to connector 50, as indicated by arrows 72. Adapter 10 and connector 50 together form an assembly 74 that connects a driving shaft (e.g., printer drive shaft 12) to a driven shaft (e.g., connector/cartridge shaft 54).

FIGS. 11-15 illustrate another example of an adapter 76 for a printer pin drive shaft 12 and a connector 78 for a toner cartridge drive mechanism. Referring to FIGS. 11-15, adapter 76 includes a cylindrical body 80 with a hollow first end 82 to receive drive shaft 12. A pair of L shaped slots 84 in adapter end 82 receive and engage pins 22 so that adapter 76 rotates with drive shaft 12. In this example, a stationary driver 86 is configured as a group of holes 88 formed in the periphery of a hollow second end 90 of adapter body 80 to drive connector 78, as described below.

In this example, connector 78 includes extendable and retractable pins 92 mounted to a disc 94. Pins 92 fit into adapter holes 88 to engage adapter body 80 so that connector 78 will rotate with adapter 76. Connector pins 92 are positioned opposite one another on connecting rods 96 at the periphery of disc 94. Disc 94 is affixed to the end of a shaft 98. Shaft 98 may be an integral part of the toner cartridge drive mechanism or coupled to the cartridge drive mechanism, for example through a flange 100. Connecting rods 96 are embedded in disc 94 so that disc 94 and thus shaft 98 rotate together with pins 92 at the urging of adapter 76.

Figure 12:
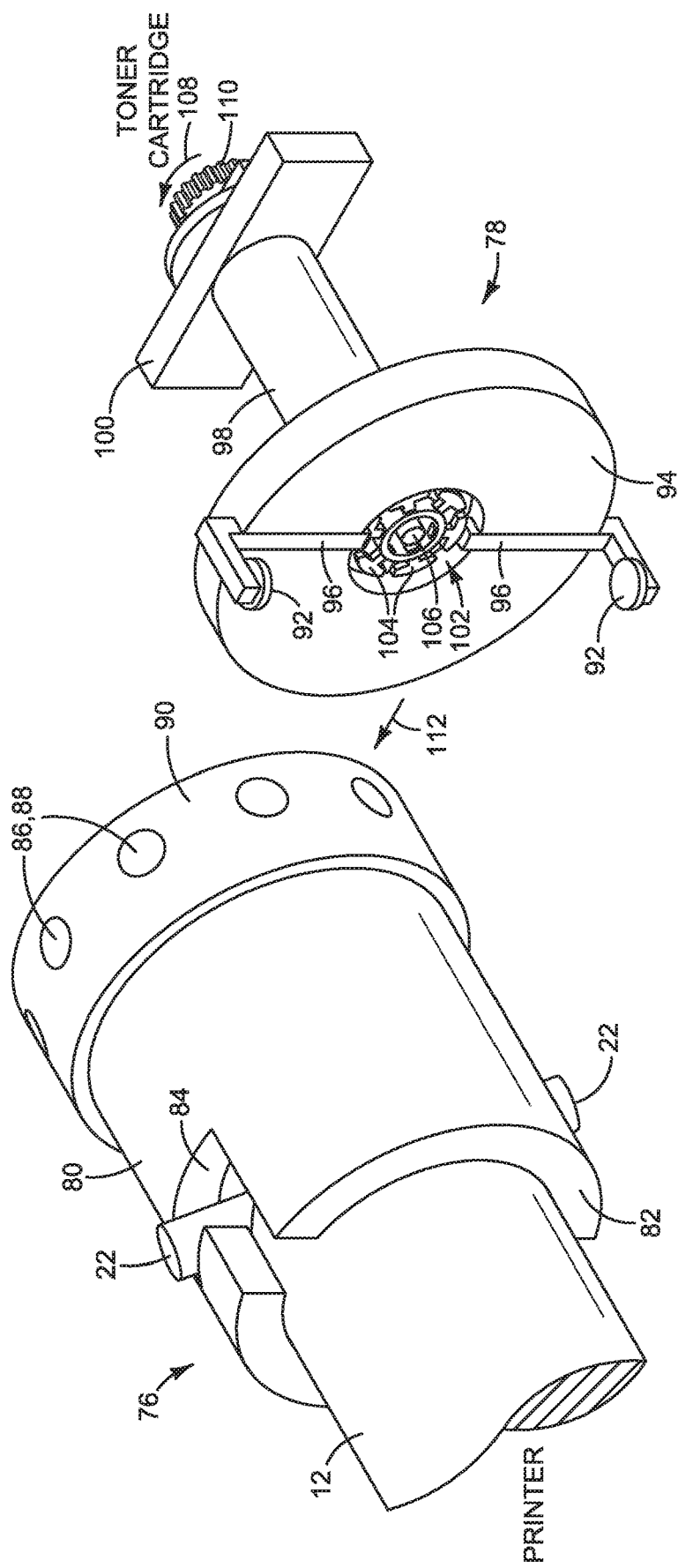

Connector 78 also includes an actuator 102 configured to extend and retract pins 92. In this example, actuator 102 includes lobes 104 coupled to an actuator shaft 106 that extends through a hollow connector shaft 98. In FIG. 12, actuator shaft 106 is rotated to extend lobes 104 and thus pins 92, as indicated by rotation arrow 108. Shaft 106 may be rotated, for example, by the user depressing an "extension" lever on the toner cartridge to turn a gear 110 on the end of shaft 106. With connector pins 92 extended, connector 78 is slid along the end of adapter 76, as indicated by arrow 112 in FIG. 12.

Figure 13:
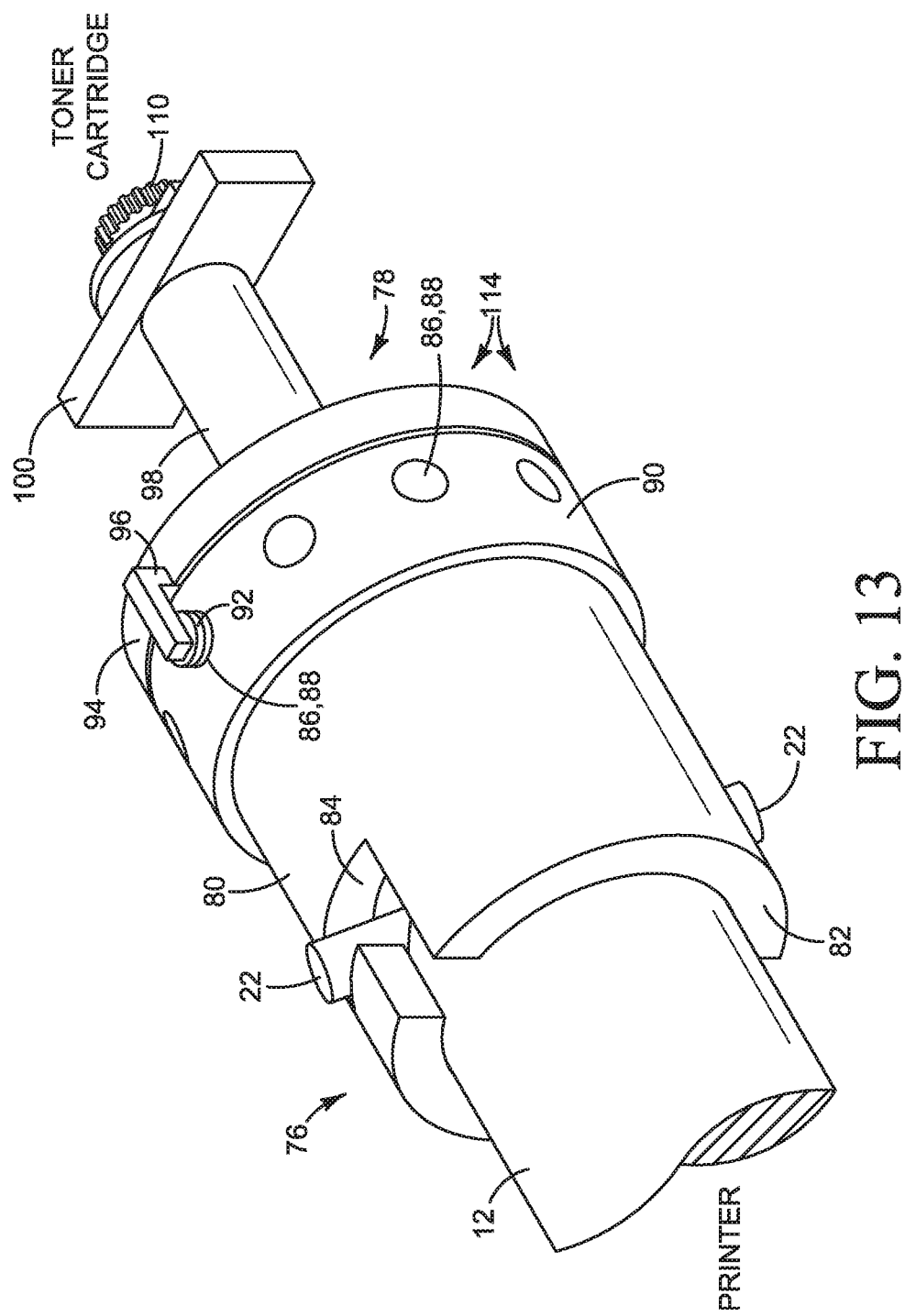
Figure 14:
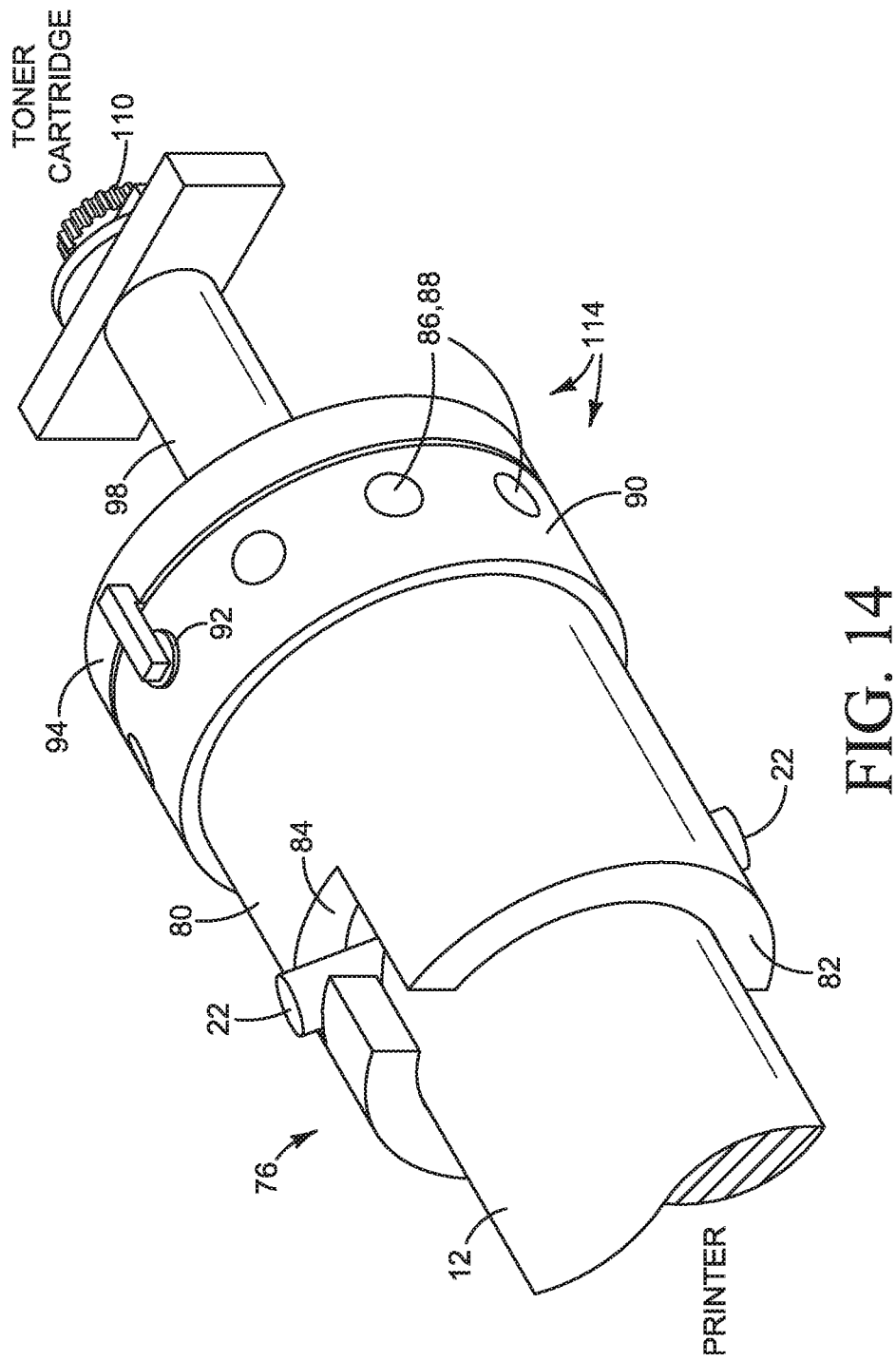
Figure 15:
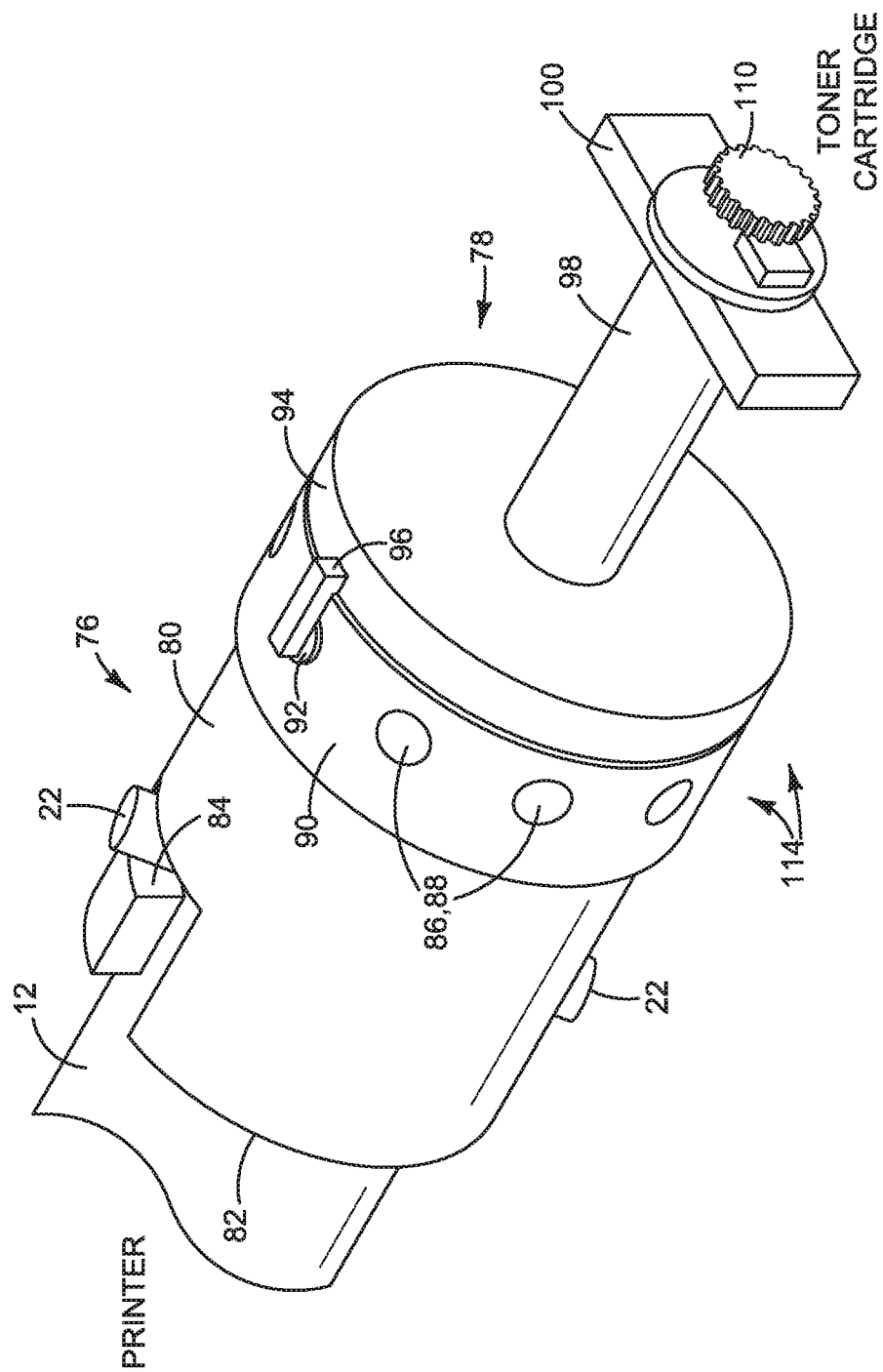

Referring to FIGS. 13-15, when the toner cartridge with connector 78 is fully inserted into the printer, pins 92 are retracted into holes 88. Thus, in this example, driver 86 on adapter 76 includes a stationary female part, holes 88, and connector 78 includes a movable male part, connector pins 92, to penetrate the female part on adapter 76. Pins 92 may be retracted, for example, by the user releasing a spring loaded extension lever and the spring returning gear 110 and thus lobes 104 and pins 92 to the position shown in FIG. 11. The retracted connector pins 92 engage adapter 76 as shown in FIGS. 14 and 15 to transmit the rotation of adapter 76 to connector 78. If connector pins 92 are not aligned with holes 88 when the pins are retracted, thus preventing pins 92 entering holes 88, pins 92 will move off the outside of adapter body 80 and enter holes 88 as adapter 76 begins to rotate. The sequence is reversed when the toner cartridge is removed from the printer.

Adapter 76 and connector 78 together form assembly 114 that connects a driving shaft (e.g., printer drive shaft 12) to a driven shaft (e.g., connector/cartridge shaft 98).

As noted at the beginning of this Description, the examples shown in the figures and described above illustrate but do not limit the scope of the patent, which is defined in the following Claims.

"A" and "an" as used in the Claims means one or more.

The invention claimed is:

1. A detachable adapter for a drive shaft that includes radially extending pins, the adapter comprising:
    a hollow first end to receive an end of a drive shaft;
    a second end opposite the first end;
    multiple L shaped slots in the first end to receive and engage radially extending pins at or near the end of the drive shaft so that the adapter will rotate with the drive shaft when the adapter receives the end the drive shaft and engages the pins;
    a driver at the second end to transmit a rotation of the adapter to a driven part, the driver being movable axially between a first position in which the driver does not protrude from the second end and a second position in which the driver protrudes from the second end to engage the driven part; and
    an actuator to move the driver between the first position and the second position.

2. The adapter of claim 1, wherein the driver comprises holes in the second end to receive and engage pins on the driven part.

3. The adapter of claim 1, wherein the driver comprises a radially stationary driver to engage the driven part.

4. The adapter of claim 1, wherein the driver is includes a pin to fit into an annular recess in the driven part and to engage the driven part when the pin is in the second position.

5. The adapter of claim 4, wherein the actuator comprises a spring loaded button to move the pin from the first position to the second position upon engagement with the driven part and to move the pin from the second position to the first position upon disengagement with the driven part.

6. An assembly to connect a driving shaft to a driven part, the assembly comprising:
    an adapter for an end of a driving shaft, the adapter comprising:
        a hollow first end to receive the end of the driving shaft;
        a second end opposite the first end;
        multiple L shaped slots in the first end to receive and engage radially extending pins at or near the end of the driving shaft so that the adapter will rotate with the driving shaft when the adapter receives the end of the drive shaft and engages the pins; and
        a driver at the second end of the adapter; and
    a connector mounted to or integral with a driven part;
    wherein,
        the driver comprises a stationary female part and the connector comprises a movable male part to penetrate the female part and engage the connector, the female part comprising holes in the second end of the adapter and the male part comprising retractable and extendible pins to penetrate the holes when retracted and withdraw from the holes when extended; or
        the driver comprises a movable male part and the connector comprises a stationary female part to receive the male part and engage the connector, the male part comprising an extendible and retractable pin and the female part comprising an annular recess to receive the pin when extended and blocker to engage the pin upon rotation of the adapter.

7. A detachable adapter to adapt a drive shaft on a printer to a drive mechanism on a toner cartridge and to transmit rotation of the drive shaft to the drive mechanism, the adapter comprising:
- a cylindrical part having a first end and a second end opposite the first end, the first end to detachably receive and engage an end of the drive shaft so that the part will rotate with the drive shaft when the part is attached to the drive shaft;
- a driver mounted to or integral with the second end to drivingly connect the part to a drive mechanism on a toner cartridge based on the part being attached to the drive shaft and the toner cartridge being installed in the printer, the driver being movable axially between a first position in which the driver does not protrude from the second end and a second position in which the driver protrudes from the second end to engage the drive mechanism; and
- an actuator to move the driver between the first position and the second position.

8. The adapter of claim 7, wherein the part comprises:
- a hollow cylinder that forms a female receiver; and
- multiple L shaped slots in the hollow cylinder to detachably receive and engage radially extending pins on the end of the drive shaft when the part is attached to the drive shaft.

9. The adapter of claim 7, wherein the driver comprises a stationary connector integral with the second end of the part.

10. The adapter of claim 9, wherein the driver comprises multiple holes in the second end to receive pins on the drive mechanism and wherein there are more holes in the part than pins on the drive mechanism.

11. The adapter of claim 7, wherein the driver comprises a radially stationary driver to engage the drive mechanism.

* * * * *